(12) United States Patent
Smith

(10) Patent No.: US 6,461,009 B2
(45) Date of Patent: Oct. 8, 2002

(54) MODULAR ROTATABLE WARNING LIGHT

(75) Inventor: Kevin M. Smith, Chester, CT (US)

(73) Assignee: Whelen Engineering Company, Incorporated, Chester, CT (US)

( * ) Notice: Subject to any disclaimer, the term of this patent is extended or adjusted under 35 U.S.C. 154(b) by 0 days.

(21) Appl. No.: 09/797,450

(22) Filed: Mar. 1, 2001

(65) Prior Publication Data

US 2002/0126472 A1 Sep. 12, 2002

(51) Int. Cl.[7] ............................................. F21V 21/30
(52) U.S. Cl. ................................. 362/35; 362/286
(58) Field of Search ......................... 362/35, 322, 324, 362/423, 449, 272, 286, 428; 318/256

(56) References Cited

U.S. PATENT DOCUMENTS 4,701,743 A * 10/1987 Pearlman et al. ............. 362/35
5,339,224 A * 8/1994 Woehler ........................ 362/35

* cited by examiner

Primary Examiner—Sandra O'Shea
Assistant Examiner—Bao Truong
(74) Attorney, Agent, or Firm—Alix, Yale & Ristas, LLP

(57) ABSTRACT

A modular rotatable warning light incorporates a standardized shaft, rotatable sub-assembly, motor and worm gear to form the mechanical core of the assembly. The rotatable sub-assembly includes a rotatable reflector mount supported by two axially spaced bearings for rotation around a hub. The axially spaced bearings significantly improve the function and service life of the rotatable warning light. The standardized parts are combined with a selected base plate, lamp holder, lamp and reflector to produce a modular rotatable warning light having a specified overall configuration. The efficiency of production and maintenance of various rotatable warning light configurations is improved by reducing engineering, production, maintenance and inventory costs.

13 Claims, 7 Drawing Sheets

MODULAR ROTATABLE WARNING LIGHT

BACKGROUND OF THE INVENTION

1. Field of the Invention

The present invention relates to rotating warning lights intended primarily for installation on land and marine vehicles and particularly to a modular rotatable warning light sub-assembly which can be readily customized for use in conjunction with a variety of warning light systems. Additionally, this invention is directed to a modular rotatable warning light having enhanced durability and ease of manufacture, installation and maintenance.

2. Description of the Related Art

Warning light assemblies in the form of light bars mounted on emergency vehicles are well known in the art. Light bars typically employ several light sources. The light sources may be constant or pulsating. There are two basic types of light sources capable of generating a pulsating or flash pattern. These two different types of pulsed light sources consist of light sources employing gaseous discharge tubes or high-intensity incandescent lamps under electronic control and mechanically driven, i.e., rotating or oscillating light sources. The mechanically driven warning lights may employ a rotating or oscillating reflector carrying a light source. A more practical prior art arrangement moves the reflector around a stationary light source. The light source and reflector cooperate with one or more stationary lenses to produce a pulsating light pattern. Design specifications resulting from user requirements or the end-use environment dictate the particular type of pulsed light generator that is to be used in a warning light system.

There has been a trend toward customization and flexibility in the design and manufacture of warning light systems for use in conjunction with emergency vehicles. This trend has been driven primarily by customer demand for improvements in the visibility, durability and overall performance of warning light systems. Additionally, warning light systems are mounted to an increasing variety of vehicles for use in various air, sea and land environments. Increased customization has resulted in a proliferation of rotatable warning light subassemblies, each appropriate for a particular application. To satisfy the need for multiple versions of a rotatable warning light, engineers have increasingly employed molded plastic components for the constituent parts of these assemblies.

Typically, a rotatable warning light assembly includes a base configured to mount to the vehicle or light bar, a stationary lamp holder mounted to the base and a rotatable sub-assembly including a reflector mount and a reflector. The sub-assembly is arranged to rotate the reflector around a stationary lamp when driven by a direct current motor. When energized, the lamp is constantly lit and the sub-assembly is rotatably driven around the stationary lamp to produce a pulsed light pattern.

The rotatable sub-assembly is typically constructed of molded plastic parts consisting of a stationary hub surrounded by a rotatable reflector mount including an external gear wheel. The lamp and its associated electrical connections remain stationary within the hub. Rotational freedom between the reflector mount and stationary hub is enhanced by using a single row of spaced ball bearings that travel in races molded into the hub and lens mount, respectively.

Warning light systems attached to emergency vehicles are frequently exposed to the most severe environmental conditions involving physical shock, vibration and large swings in temperature, from well above 100° F. to well below 0° F. Because of exposure to large temperature differentials, tolerances within the rotatable warning light assembly must be adjusted to accommodate material expansion and contraction. The warning light assembly may also be subjected to moisture, salt, sand and windblown dust. The plastic from which the hub and reflector mount are vulnerable to wear in these harsh environments. A combination of loose tolerances and wear frequently results in poor performance and premature failure in rotatable warning light assemblies. The proliferation of rotatable warning light designs requires manufacturers and service organizations to maintain a large inventory of rotatable subassemblies to keep warning light systems for emergency vehicles operational and minimize down time.

There is a need in the art for a heavy duty, standardized rotatable sub-assembly having a compact and efficient configuration suitable for use in a variety of rotating warning light arrangements.

There is also a need for a standardized rotatable sub-assembly having significantly enhanced capability to withstand physical shock and temperature swings while having smooth and reliable rotation over a long service life.

SUMMARY OF THE INVENTION

Briefly stated, the invention in one preferred form comprises several standardized components, including a shaft, rotatable sub-assembly, motor and drive train for use in a variety of rotatable warning light assemblies. The rotatable sub-assembly includes a reflector mount supported for rotation around a hub by two axially spaced bearings, thereby providing a more stable, durable and smoother running rotatable sub-assembly in a compact and efficient configuration. The reflector mount includes a worm wheel having gear teeth compatible with a motor driven worm gear.

The shaft, hub, reflector mount, motor and worm gear form the core of a modular warning light assembly. Various base plates, lamp holders, lamps and reflectors can be used in conjunction with the standardized core components to produce a variety of customized rotatable warning light assemblies. Standardized core components allow the manufacturer and service organizations to reduce inventories.

An object of the present invention is to provide a new and improved rotatable sub-assembly for a rotatable warning light where the sub-assembly is compatible with a wide variety of warning light configurations.

Another object of the present invention is to provide a new and improved rotatable warning light assembly including a heavy duty rotatable sub-assembly having improved durability and a more efficient and smooth operation.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several Figures and in which.

DETAILED DESCRIPTION OF THE PREFERRED EMBODIMENTS

Figure 1:
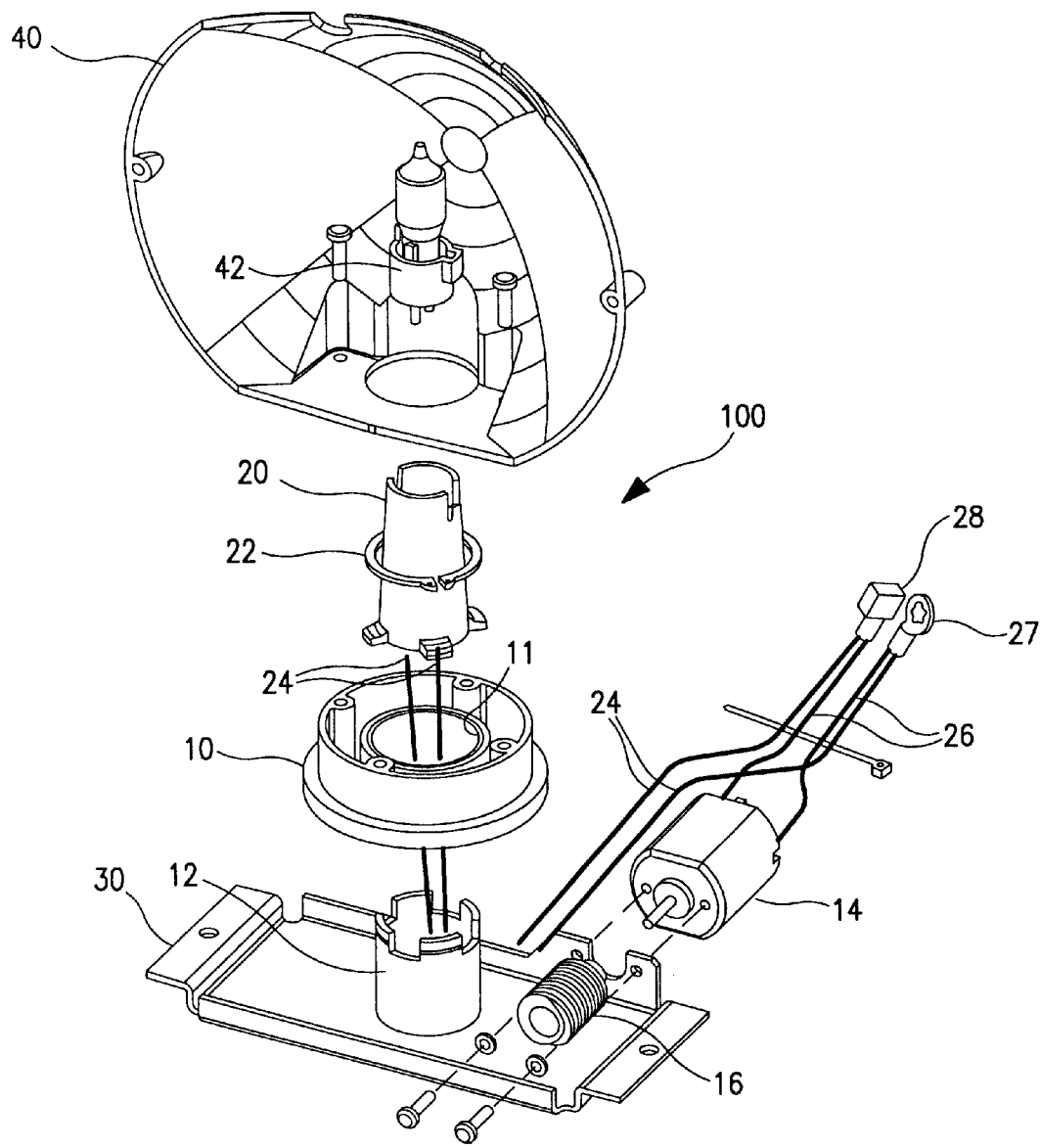
FIG. 1 is an exploded perspective view of a rotatable warning light assembly incorporating a rotatable sub-assembly in accordance with the present invention.

With reference to the drawings wherein like numerals represent like parts throughout the Figures, a preferred embodiment of a modular rotatable warning light 100 is illustrated in FIG. 1. Modular rotatable warning lights 100 in accordance with the present invention are integrated into light bar assemblies or individually mounted to vehicles to enhance the visibility and recognition of ambulances, police and fire and other emergency and service vehicles. Emergency and service vehicles are routinely exposed to extremes of heat, cold, physical shock and other wear factors such as salt and sand.

The core components of the modular rotatable warning light 100, are a shaft 12, rotatable sub-assembly 10/11, motor 14 and worm gear 16. The rotatable sub-assembly comprises a reflector mount 10 surrounding a central hub 11. The hub 11 has an interior configuration complementary to the outside diameter of the shaft 12 so that when the rotatable sub-assembly is placed over the shaft 12, the hub 11 is centered on and frictionally engaged with the shaft 12. In accordance with one aspect of the present invention, the shaft 12, rotatable sub-assembly 10/11, worm gear 16 and motor 14 form a standardized mechanical heart of a rotatable warning light assembly. A variety of rotatable warning light configurations are built around these core components in a manner that will be discussed below.

Figure 2:
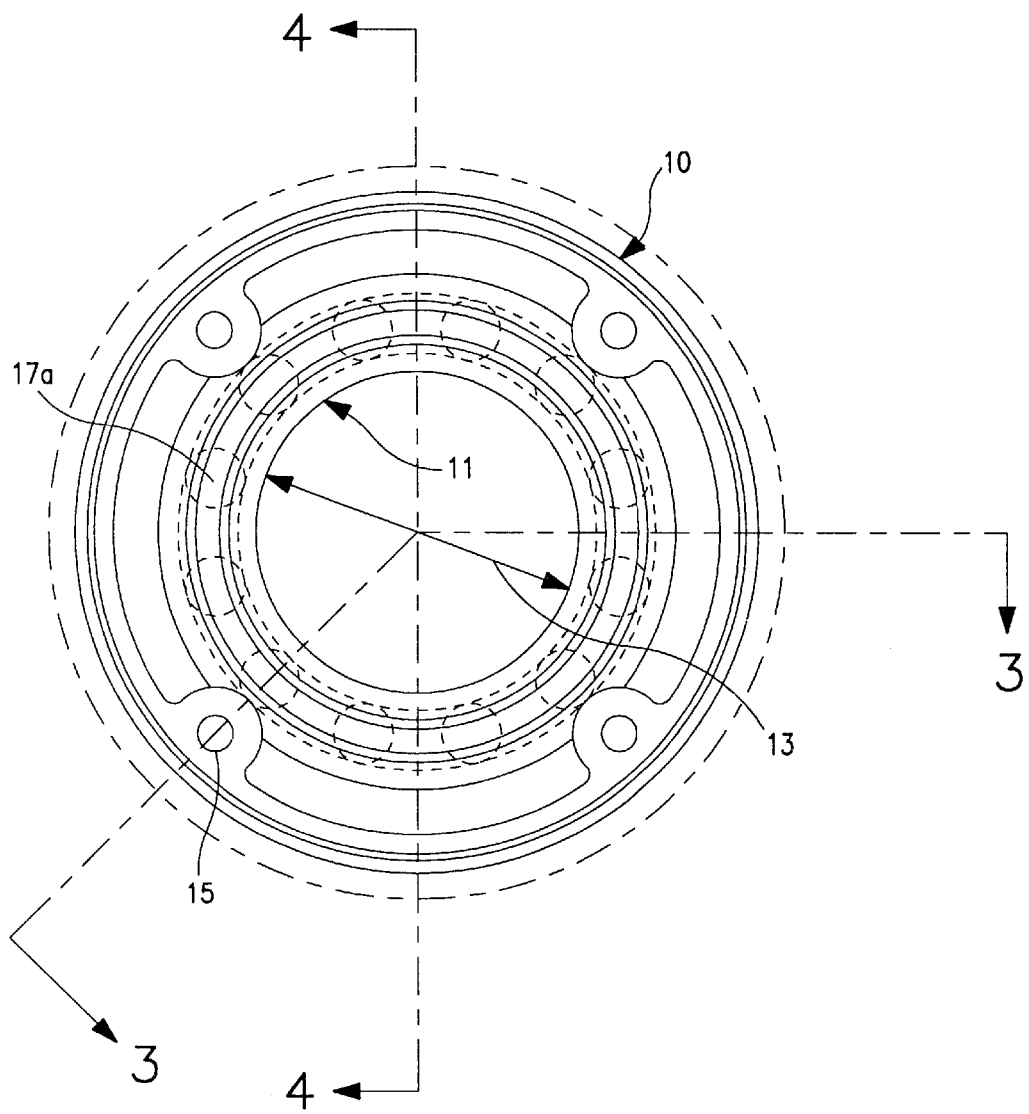
FIG. 2 is a top plan view, partially in phantom, of the rotatable sub-assembly of the rotatable warning light assembly of FIG. 1.
Figure 3:
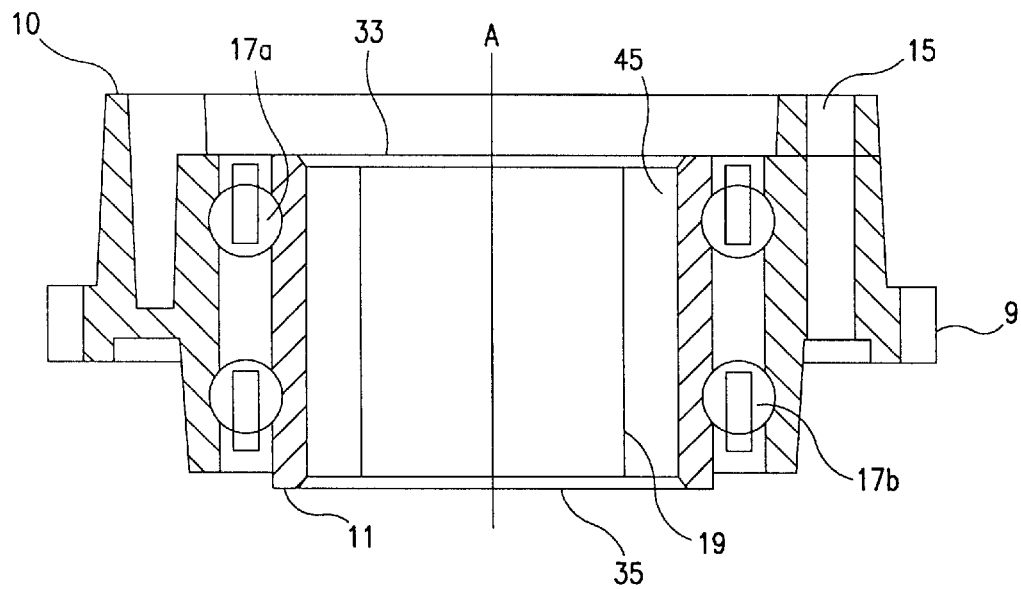
FIG. 3 is a sectional view through the rotatable sub-assembly of FIG. 2, taken along line 3—3 thereof.
Figure 4:
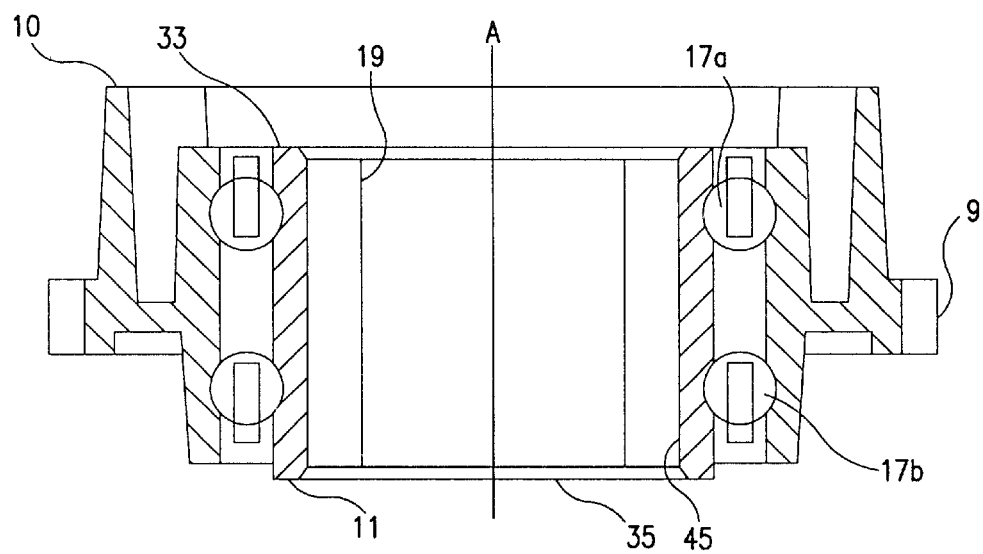
FIG. 4 is a sectional view through the rotatable sub-assembly of FIG. 2, taken along line 4—4 thereof.

FIGS. 2–4 illustrate the configuration of the rotatable sub-assembly 10/11. The hub 11 and reflector mount 10 are symmetrically arranged around an axis of rotation A. Two axially spaced rows of bearings 17a, 17b support the reflector mount 10 for rotation relative to the hub 11. The reflector mount 10 is preferably a molded part including an integrally molded gear wheel 9. The gear wheel includes an arrangement of teeth configured to mesh with the worm gear 16. The reflector mount 10 includes two axially spaced bearing races.

Hub 11 is also preferably a molded part including two circumferential bearing races around which the two axially spaced arrays of ball bearings 17A, 17B will be arranged. The two arrays of ball bearings 17a, 17b support the reflector mount 10 axially and radially relative to the hub 11, significantly reducing the off-axis wobble present in many single-bearing designs. Two axially spaced bearings can withstand double the axial load of a single bearing of similar construction. The spaced configuration of the bearings also stabilizes the reflector mount 10 and associated reflector 40 when exposed to vibration and physical shock.

The hub 11 is configured with an interior diameter 13 complementary to the outside diameter 39 of the shaft 12. In the illustrated embodiment, the outside diameter 39 of the shaft 12 is approximately 1 inch. To facilitate assembly, the interior-diameter 13 of the hub 11 is molded 0.0005" larger than the diameter 39 of the shaft 12. To facilitate frictional engagement between the inner surface 45 of the hub 11 and the shaft 12, a series of ribs 19 are arranged around the interior surface 45 of the hub 12. The ribs 19 are equiangularly spaced around the interior surface 45. The junction of two vertical surfaces converging at a 90° angle forms each rib 19. The axial ribs project radially inwardly from the interior surface 45 of the hub 11, a distance of approximately 0.0005" . The ribs are configured to deform as the hub is press fit over the shaft, providing firm frictional engagement between the hub 11 and the shaft 12. One of skill in the art would recognize that many possible arrangements of ribs, points or protrusions of the inside surface 45 of the hub 11 or outside surface of the shaft 12 would serve this function.

The hub 11 and reflector mount 10 are preferably unitary molded plastic parts. Preferred materials for molding the reflector mount and hub are acetal and nylon. Warning lights in which the hub and rotatable reflector mount will be used are typically exposed to a wide range of temperatures and environmental conditions. Such large temperature differentials cause the plastic parts to expand and contract to a greater degree than would similarly configured metal parts. Tolerance considerations are critical to effectively accommodate the expansion and contraction of the plastic. If the parts are configured too tightly, then the assembly will bind when exposed to high temperatures. If the parts are configured with too loosely, cold temperatures will cause excessive play between the hub and the reflector mount resulting in a wobbly and noisy warning light assembly. Additionally, over time the plastic parts will wear, further increasing the play between the hub 11 and the rotatable reflector mount 10.

A rotatable warning light in accordance with the present invention addresses the stability, wear and tolerance issues by utilizing two axially spaced rows of ball bearings 17a, 17b. This arrangement provides a smooth and stable rotating assembly in which the inevitable wear is divided between the two rows of ball bearings and their associated molded races. As a result, the assembly is more stable and resistant to shock, more durable, smoother running, with a significantly longer service life.

Figure 5:
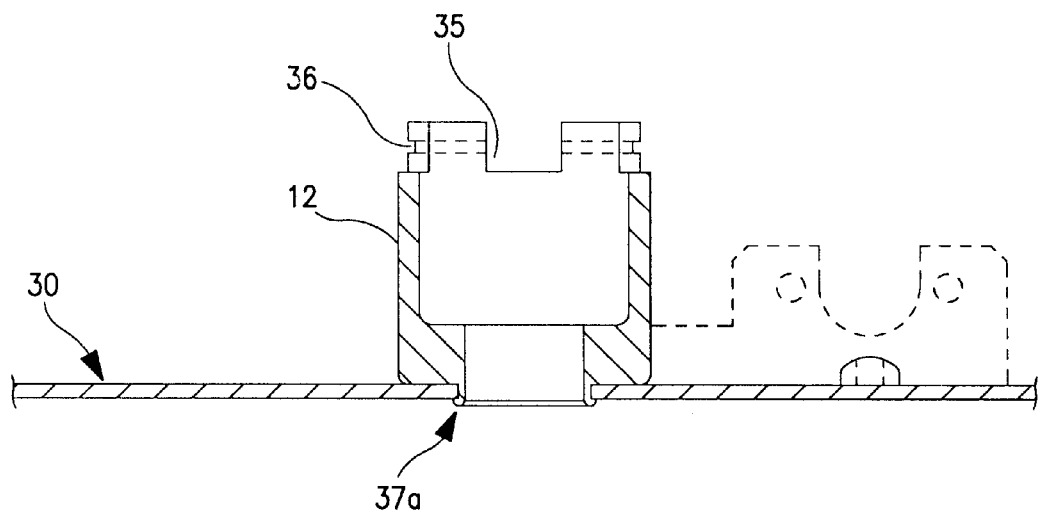
FIG. 5 is a partial sectional view through the shaft and base plate of the rotatable warning light assembly of FIG. 1;.
Figure 6:
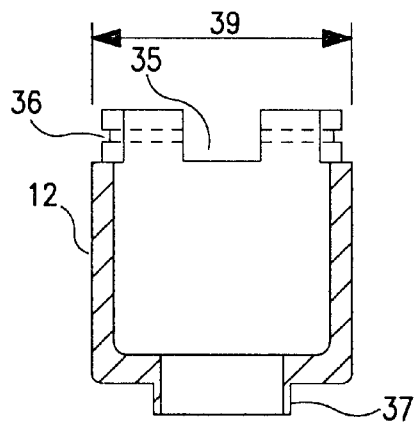
FIG. 6 is a sectional view through the shaft illustrated in FIG. 5.
Figure 7:
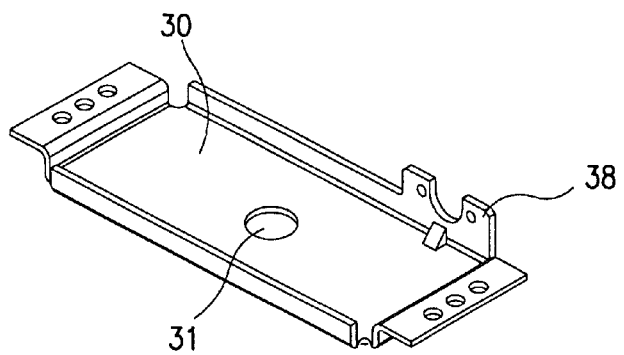
FIG. 7 is a perspective view of the base plate of the rotatable warning light assembly of FIG. 1.

FIGS. 5–7 illustrate the configuration of one preferred embodiment of the shaft 12 and its relationship to a representative base plate 30. The shaft 12 is a hollow cylindrical part formed preferably of steel. A thin tubular extension 37 projects from one end of the shaft. This thin tubular extension 37 is deformed or swaged around an opening 31 in the base plate 30 to form a secure engagement 37a between the shaft 12 and the base 30. The axially opposed end of the shaft defines a symmetrical arrangement of four equiangularly spaced rectangular slots 35. An outward facing circumferential groove 36 traverses the exterior of the shaft 12 at approximately the axial midpoint of the rectangular slots 35.

FIG. 7 illustrates a representative base plate 30 to which the components of the rotatable warning light assembly 100 can be mounted. Although the configuration of the base plate 30 will vary depending upon the ultimate configuration of the warning light system, all the base plates will have several elements in common in accordance with one aspect of the present invention. First, each base will include an opening 31 configured to receive the tubular extension 37 of the shaft 12 as is best illustrated in FIG. 5. Each base plate also includes a motor bracket such as 38. The base plates also include a structure for mounting the base plate to the vehicle or warning light system.

While the configuration of the base plate 30 can change as needed to meet specifications, the shaft 12 and motor 14 configuration are intended to remain the same. As a result, the general configuration of the opening 31 and motor mount 38 on any particular base plate 30 will be substantially similar in accordance with the present invention. Preferred materials for the base plate and shaft are steel. A steel substructure provides additional support, stability and rigidity to the rotatable warning light assembly 100. Moreover, the shaft 12 and base plate 30 are intended to be permanent parts while wear items such as the motor 14, worm gear 16, reflector mount 10 and hub 11 are configured as easily replaceable, standardized items.

Figure 10:
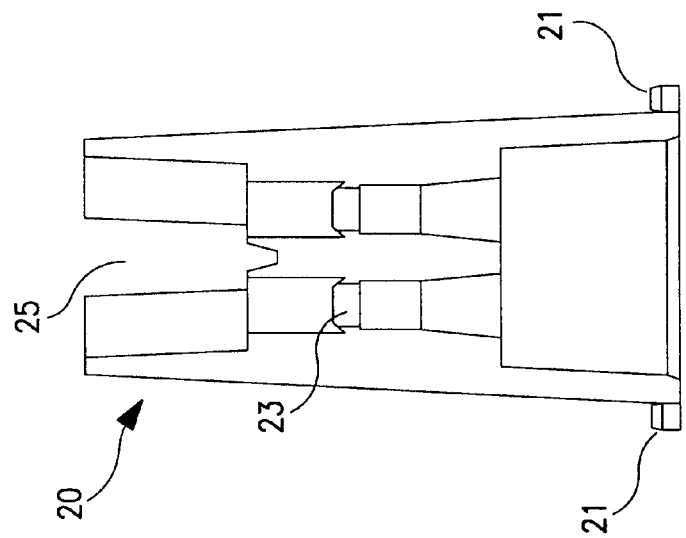
FIG. 10 is a sectional view of the lamp holder of FIG. 9, taken along line 10—10 thereof.
Figure 9:
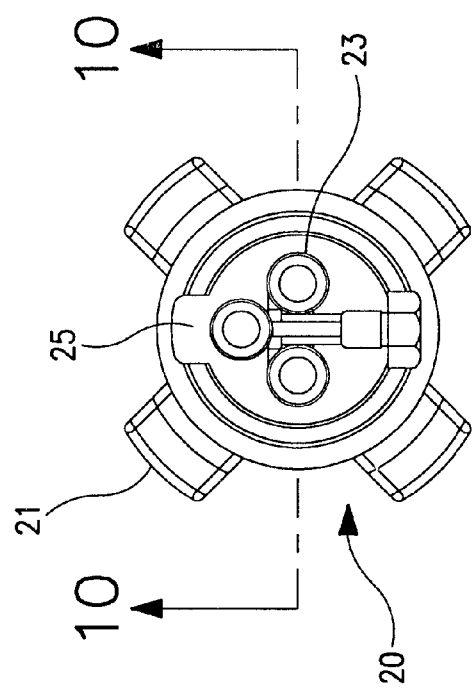
FIG. 9 is a top plan view of the lamp holder of FIG. 1.

The slotted configuration of the shaft 12 is arranged to be compatible with the base portion of a lamp holder 20. FIGS. 1, 9, and 10 illustrate a representative configuration for a lamp holder 20. The lamp holder 20 is essentially a cylindrical molded plastic part having a plurality of radially projecting legs 21 extending from a base portion and including an axially opposed lamp-receiving socket. With reference to FIG. 9, the socket includes receptacles 23 that provide locations for the retention of electrical connectors (not illustrated). The socket provides an interface between the lamp and the electrical conductors 24. Each lamp holder 20 will project above the base portion and legs 21 a distance dictated by the desired configuration of the rotatable warning light assembly. The socket in each lamp holder 20 is of course configured to retainably receive the lamp dictated by the overall design. It should be emphasized that while the base portion and legs 21 will be standardized for interaction with the slotted shaft 12, the configuration of the remainder of the lamp holder can be selected to meet the specifications of a desired rotatable warning light assembly. The socket may include a slot 25 or other arrangement to index the bulb with respect to the lamp holder as is known in the art.

FIG. 1 is an exploded view of a representative rotatable warning light assembly 100, including the standardized shaft 12, reflector mount 10, hub 11, motor 14, and worm gear 16. With reference to FIGS. 3 and 4, the lower end 35 of the hub 11 is configured to protrude below the rotatable reflector mount 10. During assembly, the rotatable sub-assembly 10/11 is forced over the shaft 12 until the lower end 35 of the hub 11 contacts the top surface of the base plate 30. The axial installation force is exerted on the top surface 33 of the hub 11 so that excessive pressure is not placed on the bearing assemblies 17a, 17b connecting the hub 11 with the reflector mount 10. A selected lamp holder such as lamp holder 20 is arranged so that the legs 21 align with the slots 35 of the shaft 12. The lamp holder 20 is then axially inserted into the shaft 12.

Figure 12:
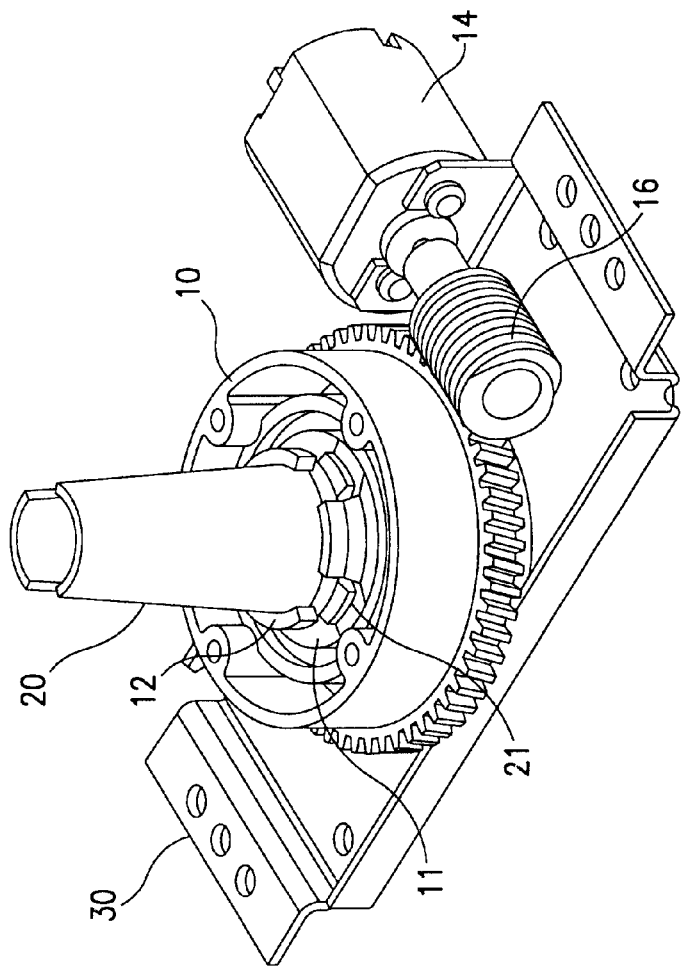
FIG. 12 is a perspective view of the base plate, rotatable sub-assembly, motor, worm gear and lamp holder of FIG. 1 in an assembled configuration.
Figure 11:
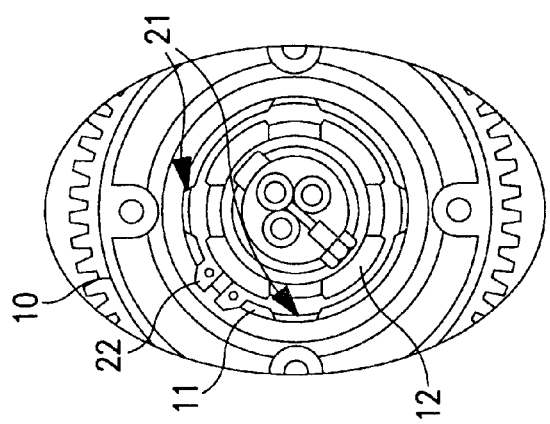
FIG. 11 is a top plan view of an assembled shaft, rotatable sub-assembly, lamp holder and spring clip in accordance with the present invention.

The installed relationship between the lamp holder 20, hub 11 and shaft 12 is best illustrated in FIGS. 11 and 12. From the overhead view of FIG. 11 it can be seen that each leg 21 is configured to protrude radially beyond the shaft and project over the upper surface 33 of the hub 11. A snap ring 22 is inserted in circumferential groove 36 of the shaft 12, thereby retaining both the lamp holder 20 and the hub 11 in fixed relationship to the shaft 12. The rotatable sub-assembly 10/11 is thus securely mounted around the shaft 12 and adjacent the base 30.

With reference to FIG. 1, electrical leads 24 are threaded through the axial opening in the shaft 12 and into the lamp holder receptacles 23 where they form a junction for providing power to the lamp 42. During operation of the rotatable warning light assembly 100, the shaft 12, hub 11, lamp holder 20 and lamp 42 remain stationary while the reflector mount 10 and reflector 40 rotate about the lamp. The reflector mount 10 includes a series of bores 15 for the reception of mounting hardware (see FIGS. 2, 3). FIG. 1 illustrates a representative reflector 40 configured to pass over the lamp holder and lamp to interface with the reflector mount 10.

It should be recognized that the lamp holder 20, lamp 42 and reflector 40 together define an optical system that will provide a pre-established light pattern according to a given specification. The lamp holder, lamp and reflector selected also determine the axial height and radial dimensions required for operation of the rotatable warning light assembly 100. Alternative lamp holders, lamps and reflectors will of course be selected to meet the spatial constraints dictated by the overall rotatable warning light assembly system configuration.

Figure 8:
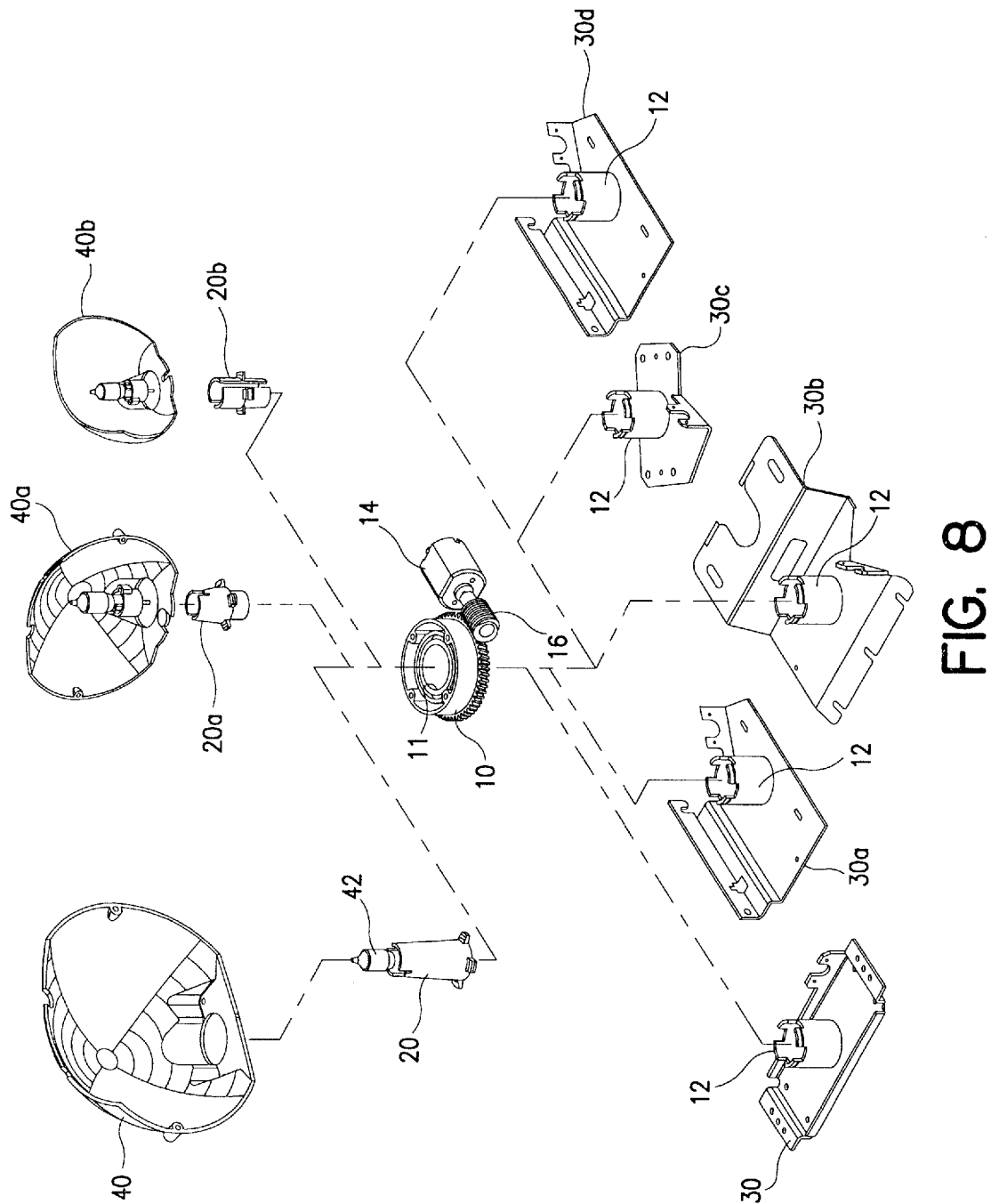
FIG. 8 is an exploded perspective view illustrating several alternative embodiments of rotatable warning light assembly including a standardized shaft, rotatable sub-assembly, motor and worm gear in accordance with the present invention.

FIG. 8 is an exploded view illustrating the standardized shaft 12, reflector mount 10, hub 11, motor 14, and worm gear 16 in functional conjunction with a variety of base plates 30, 30a, 30b, 30c, 30d, lamp holders 20, 20a, 20b, and reflectors 40, 40a, 40b. It can be seen from this illustration that the standardized shaft 12 can be mounted to a variety of base plates 30, 30a–30d. It should be noted that each of the base plates includes an aperture for swage mounting of the shaft 12, as well as a motor mount bracket and a structure for securing the base to a vehicle or warning light assembly. Each of the lamp holders 20, 20a, 20b includes a substantially similar arrangement of radially projecting legs configured to mate with the slotted end of the shaft 12. Each of the reflectors 40, 40a, 40b, while having alternative height, width and optical configurations, includes slots or holes configured to align with the bores provided in the reflector mount 10. The use of standardized parts simplifies the creation of a variety of rotatable warning light assemblies. Further, maintenance of the several assemblies is simplified because the wear items are standard interchangeable parts easily removed and replaced.

While a preferred embodiment of the foregoing invention has been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A modular rotatable warning light assembly comprising:

a cylindrical shaft having an axis, a first outside diameter and an open first end including a plurality of axially projecting tabs separated by a plurality of slots, said first end including an outward facing circumferential groove, said groove being orthogonal to said axis and traversing at least two of said tabs;

a reflector support subassembly comprising a reflector mount and a hub, said reflector mount surrounding said hub and supported for rotation about said hub by two axially spaced bearings disposed between an inward facing surface of said reflector mount and an outward facing surface of said hub, said reflector mount including an outward facing circumferential gear wheel and said hub having an inward facing cylindrical surface having a second diameter substantially equal to said first diameter;
a motor including a shaft;
a worm gear mountable to said shaft, said worm gear configured to mesh with said gear wheel;
a plurality of differently configured lamp holders, each lamp holder having a base including a plurality of radially projecting legs complementary to said slots, an axial passage for electrical conductors and socket means for receiving a lamp;
a plurality of differently configured lamps, each lamp complementary to at least one socket means;
a plurality of differently configured reflectors, each reflector having a reflecting surface and fixable to said reflector mount;
a plurality of differently configured base plates, each base plate including an aperture for securing said shaft, a bracket for supporting said motor and means for fixing said base plate to a support structure;
wherein said shaft is secured to a base plate selected from said plurality of differently configured base plates, said hub is disposed around said shaft so that said reflector mount is supported for rotation about said shaft, said motor is mounted to the bracket of said selected base plate, said worm gear is mounted to said shaft and meshed with said gear wheel so that rotation of said shaft imparts rotational motion to said reflector mount, a lamp holder selected from said plurality of differently configured lamp holders is axially inserted into said shaft so that at least one of said legs fits within at least one of said slots, said lamp holder being secured to said shaft, a lamp selected from said plurality differently configured of lamps is installed in the socket of said lamp holder and a reflector selected from said plurality of differently configured reflectors is fixed to said reflector mount for rotation therewith.

2. The modular rotatable warning light assembly of claim 1, wherein the lamp holder selected from said plurality of differently configured lamp holders includes an axial dimension between said base and said socket, a base configuration and a socket configuration dictated by the specifications of the modular rotatable warning light assembly.

3. The modular rotatable warning light assembly of claim 1, wherein the lamp selected from said plurality of differently configured lamps includes a brightness, voltage, current draw, color, base configuration and physical configuration dictated by the specifications of the modular rotatable warning light assembly.

4. The modular rotatable warning light assembly of claim 1, wherein the reflector selected from said plurality of differently configured reflectors includes a height, width, focal point and reflective pattern dictated by the specifications of the modular rotatable warning light assembly.

5. The modular rotatable warning light assembly of claim 1, wherein the reflector selected from said plurality of differently configured reflectors includes a mounting structure, aperture location, bracket location and overall dimensions dictated by the specifications of the modular rotatable warning light assembly.

6. A reflector support subassembly for a modular rotatable warning light assembly, said reflector support subassembly comprising:
a hub having inside and outside surfaces and first and second ends and defining a substantially cylindrical through space having an axis;
a reflector mount disposed around said hub and including inward and outward facing surfaces and axially spaced upper and lower ends, said outward facing surface including gear means for receiving rotational forces applied to said reflector mount;
at least two bearing means for supporting said reflector mount for rotation relative to said hub,
wherein said bearing means are axially spaced from each other and disposed between said reflector mount inward facing surface and said hub outer surface in a generally orthogonal relationship to said axis.

7. The reflector support subassembly of claim 6, wherein said hub second end axially extends beyond said reflector mount lower end.

8. The reflector support subassembly of claim 6, wherein said gear means comprise a gear wheel configured to receive rotational force from a worm gear.

9. The reflector support subassembly of claim 6, wherein each said bearing means comprise an array of angularly spaced ball bearings arranged to travel in a pair of radially opposed races provided on said outer surface and said inward facing surface, respectively, said races being substantially parallel to each other and generally orthogonal to said axis.

10. The reflector support subassembly of claim 6, wherein said upper surface comprises a mounting means for fixing a reflector to said reflector mount for rotation therewith.

11. The reflector support subassembly of claim 6, wherein said hub and reflector mount are molded from plastic material selected from the group consisting of nylon and acetal.

12. A method for manufacturing a rotatable warning light assembly including a cylindrical shaft having a first end configured to mount to a base plate and a second end configured to receive a lamp holder, a reflector support subassembly comprising a hub and a reflector mount supported for rotation around said hub, said reflector mount including an outwardly facing gear wheel, said hub configured to surround said shaft to be supported thereby, a motor including a shaft, a worm gear mountable to said shaft and configured to mesh with said gear wheel, said method comprising the steps of:
selecting a base plates from a plurality of differently configured base plates, each said base plate in said plurality of differently configured base plates including a mounting means for securing said shaft first end, bracket means for supporting said motor and fixing means for affixing said base plate to a support structure;
securing said shaft first end to said base plate;
installing said hub over said shaft so that said reflector mount is supported for rotation relative to said base plate and shaft;
fixing said worm gear to said motor shaft for rotation therewith;
mounting said motor to said bracket means so that said worm gear meshes with said gear wheel;
selecting a lamp holder from a plurality of differently configured lamp holders, each said lamp holder in said plurality of differently configured lamp holders including a base complementary to said shaft second end, an axial passage for electrical conductors and socket means for receiving a lamp and providing an interface between said conductors and said lamp;
mounting said lamp holder base to said shaft second end so that said lamp holder projects above said shaft along said axis;

selecting a lamp having a configuration complementary to said lamp holder socket means from among a plurality of differently configured lamps, each lamp in said plurality of differently configured lamps having a configuration complementary to at least one socket means;

selecting a reflector from a plurality of differently configured reflectors, each said reflector in said plurality of differently configured reflectors having a reflecting surface and being fixable to said reflector mount;

mounting said reflector to said reflector mount for rotation therewith.

13. The method of claim 12, wherein said method comprises the step of:

supporting the reflector mount for rotation with two axially spaced bearings disposed between said hub and said reflector mount.

* * * * *